United States Patent
Scaglione et al.

(10) Patent No.: US 7,420,938 B2
(45) Date of Patent: Sep. 2, 2008

(54) FINDING DUPLEX MISMATCHES IN COPPER BASED NETWORKS

(75) Inventors: Giuseppe Scaglione, Sacramento, CA (US); Kevin Young, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 785 days.

(21) Appl. No.: 10/866,346

(22) Filed: Jun. 10, 2004

(65) Prior Publication Data

US 2006/0005102 A1 Jan. 5, 2006

(51) Int. Cl.
*H04L 5/16* (2006.01)
(52) U.S. Cl. ............... 370/296; 370/242; 370/276; 370/282
(58) Field of Classification Search ........... 370/276, 370/282, 463, 242, 296; 709/227
See application file for complete search history.

(56) References Cited

U.S. PATENT DOCUMENTS

| | | | | |
|---|---|---|---|---|
| 5,610,903 A | * | 3/1997 | Crayford | 370/213 |
| 6,580,697 B1 | * | 6/2003 | Gardner et al. | 370/296 |
| 6,665,275 B1 | * | 12/2003 | Davy et al. | 370/282 |
| 6,938,086 B1 | * | 8/2005 | Banga | 709/227 |
| 2006/0221843 A1 | | 10/2006 | Cidon et al. | |

OTHER PUBLICATIONS

Bunch, Bill; "An Introduction to Auto-Negotiation"; 1995; SCYLD Software; pp. 1-12.*
"Port Configuration", [webpages] [online], retrieved on Jan. 15, 2004. Retrieved from the internet: http://www.cisco.com/univercd/cc/td/doc/product/lan/c2900xl/29_35xp/olhelp/porthelp.htm. Total pp. 5.

* cited by examiner

*Primary Examiner*—Ricky Ngo
*Assistant Examiner*—DeWanda Samuel

(57) ABSTRACT

In an embodiment, a method for finding duplex mismatches in a copper based network, includes: detecting late collisions and cyclic redundancy check (CRC) errors; if a port is in auto-negotiation and up in half-duplex and over threshold late collisions have been detected, then informing the user of a duplex mismatch and suggesting to the user to set the port to full duplex; and if the port is in forced full-duplex mode and over threshold CRC errors have been detected, then informing the user of a duplex mismatch and suggesting to the user to set the port to auto-negotiations mode.

12 Claims, 2 Drawing Sheets

FIG. 2

Duplex mismatch finder logic

- Late Collisions or CRC errors flag set due to counter exceeding user settable threshhold 205

Is Duplex mismatch possible logic 120

- Link? 210
  - Yes → 100TX or 1000T port? 225
    - Yes → Linked in Gig 230
      - No → Config = 10HDX, 10FDX, 100HDX, or 100FDX? 235
        - Yes → Set isForced flag 245
        - No → Did auto-negotiation complete successfully? 240
          - Yes → Set autoHDX flag 250
          - No → (to Clear all flags)
      - Yes → Clear all flags, no duplex mismatch possible. 215 → Return 220
    - No → Clear all flags
  - No → Clear all flags Return duplex mismatch is possible, flags 255

Event log message to send to user logic 125

- autoHDX and Late collisions counter? 260
  - Yes → Inform user of Duplex mismatch suggest setting port to Full Duplex 270
  - No → isForced and CRC errors counter? 265
    - Yes → Inform user of Duplex mismatch suggest setting port to Auto Negotiation 275
    - No → (return)

Send Event log message, return 280

FINDING DUPLEX MISMATCHES IN COPPER BASED NETWORKS

TECHNICAL FIELD

Embodiments of the invention relate generally to network systems, and more particularly to an apparatus and method for finding duplex mismatches in copper based networks.

BACKGROUND

Many local area network (LAN) products today use a medium formed by copper wire pairs for the transmission and reception of data. A network that used the copper wire pairs is defined as a copper based network. Existing technology based on the copper wire pairs include, for example, 10BASE-T, 100BASE-TX, and 1000BASE-T. All of these technologies have the ability to negotiate speed, duplex mode (half duplex or full duplex), flow-control, and other important aspects of a link operation by using low frequency pulses to communicate the desired state of operation for the link prior to actually engaging in the specific link signaling. This negotiation process is called "auto-negotiation".

During link negotiation between two nodes in a link in a network, as an example, a port of a first node may be set in the auto-negotiation mode, while a port of the second node is not set in the auto-negotiation mode. As a result, the first node will be made to negotiate at half-duplex. For example, the first node (which is in auto-negotiation mode) will be set to negotiate at 100 half-duplex or full-duplex, while the second node (which is not in auto-negotiation mode) will be set to 100 full-duplex. As known to those skilled in the art, full-duplex data transmission means that data can be transmitted in both directions on a signal carrier at the same time. For example, on a local area network with a technology that has full-duplex transmission, one workstation can be sending data on the line while another workstation is receiving data. As also known to those skilled in the art, half-duplex data transmission means that data can be transmitted in both directions on a signal carrier, but not at the same time. For example, on a local area network using a technology that has half-duplex transmission, one workstation can send data on the line and then receive data on the line once its data has been received by the link partner.

The above-mentioned duplex operation mismatch (duplex mismatch) can lead to degraded performance between the two nodes and result in trouble calls by the-customer to the network support center of a node vendor. In a 10BASE-T/100BASE-T network, duplex mismatch problems is the most fielded calls by support engineers from customers and is thus the most costly product issue. Current technology does not provided the ability for the customer to know and detect a duplex mismatch condition, does not reduce the countless support calls to the support engineers from customers, and does not lead to reductions in costs for the node vendor.

A current port configuration method from Cisco Corporation only provides settable flags that indicate network error, as disclosed in the link However, this previous port configuration method does not provide specific guidance to the customer on identifying the network problem and simply shuts down the port and informs the customer that an error has occurred.

Therefore, the current technology is limited in its capabilities and suffers from at least the above constraints and deficiencies.

SUMMARY OF EMBODIMENTS OF THE INVENTION

In an embodiment of the invention, a method for finding duplex mismatches in a copper based network, includes:

detecting late collisions and cyclic redundancy check (CRC) errors;

if a port is in auto-negotiation and up in half-duplex and over threshold late collisions have been detected, then informing the user of a duplex mismatch and suggesting to the user to set the port to full duplex; and if the port is in forced full-duplex mode and over threshold CRC errors have been detected, then informing the user of a duplex mismatch and suggesting to the user to set the port to auto-negotiations mode.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2 is a block diagram of a method in accordance with an embodiment of the invention.

DETAILED DESCRIPTION OF PREFERRED EMBODIMENTS

Figure 1:
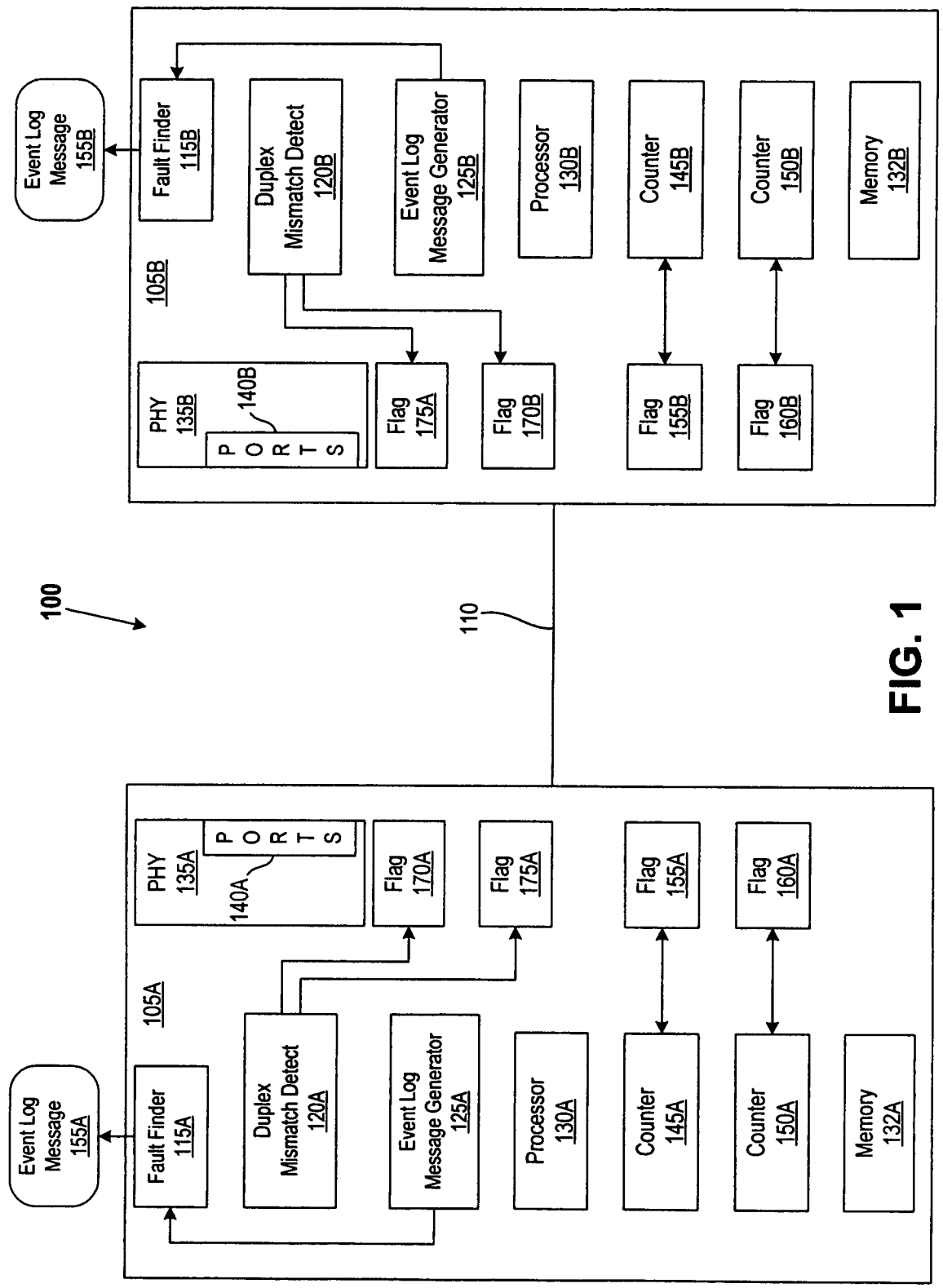
FIG. 1 is a block diagram of an apparatus (system), in accordance with an embodiment of the invention.

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

FIG. 1 is a block diagram of an apparatus (system) 100 that can implement an embodiment of the invention. The apparatus 100 includes two nodes 105A and 105B (generally, node 105) that are connected by a link 110. The nodes 105A and 105B are network devices such as, for example, network switches. The nodes 105A and 105B includes fault finders 115A and 115B, duplex mismatch detect module 120A and 120B, event log message generator module 125A and 125B, processors 130A and 130B, and PHY (physical link layer) 135A and 135B (generally, PHY 135), respectively, as shown in FIG. 1. The PHYs 135A and 135 include port 140A and 140B, respectively, and include other suitable standard hardware components in network devices and permit the transmission of data over the link 110. For example, a PHY 135 typically includes an MDI (medium dependent interface) which is the connection to the link (medium) 110 (i.e., the direct physical and electrical connection to the link).

Auto-negotiation automatically configures duplex and speed. It is also possible to turn off auto-negotiation and forced both speed and duplex.

The duplex mismatch detect module 120 and event log message generator 125 can be integrated into a single module which can be called as a duplex mismatch finder.

The fault finders 115A and 115B, duplex mismatch detect module 120A and 120B, and event log message generator module 125A and 125B are typically implemented in software and are stored in a memory (e.g., memory 132A and 132B) in the nodes 105. The fault finders 115A and 115B, duplex mismatch detect module 120A and 120B, and event log message generator module 125A and 125B are typically programmed in a suitable programming language, such as, for example, C, and are created by use of known code programming techniques.

The processors 130A and 130B (generally, processor 130) execute the fault finders 115A and 115B (generally, fault finder 115), duplex mismatch detect module 120A and 120B (generally, module 120), and event log message generator module 125A and 125B (generally, module 125), respectively, and also execute other software or firmware in a node 105.

The fault finder 115 is a module that detects for fault conditions in a network. A fault condition can include, for example, a loop configuration in the network. A fault condition can also include over threshold late collisions and over threshold cyclic redundancy check errors, as described below. An embodiment of the fault finder 115 is implemented in, for example, the PROCURVE 5304 and 5308 switches and other switches which are commercially available from HEWLETT-PACKARD COMPANY.

The fault finder 115A will check the error counters 145A and 150A, while fault finder 115B will check the error counters 145B and 150B. The fault finder 115A will generate an event log message 155A, based upon the values in the late collision counter 145A and CRC error counter 150A exceeding threshold values that are set by the user and based upon whether the port is set to forced mode or auto-negotiation mode, as discussed below. When the collision counter 145A exceeds a threshold value (a user-settable boundary), the fault finder 115A sets a flag 155A. When the CRC error counter 150A exceeds a threshold value (a user-settable boundary), the fault finder 115A sets a flag 160A. The flags 155A and 160A are typically values that are set in a memory (e.g., memory 132A) in the node 105A.

Similarly, the fault finder 115B will generate an event log message 155B, based upon the values in the late collision counter 145B and CRC error counter 150B exceeding threshold values that are set by the user, as discussed below. When the collision counter 145B exceeds a threshold value (a user-settable boundary), the fault finder 115B sets a flag 155B. When the CRC error counter 150B exceeds a threshold value (a user-settable boundary), the fault finder 115B sets a flag 160B. The flags 155B and 160B are typically values that are set in a memory (e.g., memory 132B) in the node 105B.

Various parameters are then checked by the duplex mismatch detect modules 120 and event log message generator 125 (i.e., parameters are checked by the duplex mismatched finder) in order to detect a duplex mismatch, as discussed below, in accordance with an embodiment of the invention.

Various standard components and/or software in the nodes 105A and 105B (and in the network 100) have been omitted in FIG. 1 for purposes of clarity and for purposes of focusing on the functionalities of embodiments of the invention.

It should be appreciated that, in alternative embodiments, the network system 100 may include components and products other than those discussed above. Moreover, the network system 100 can be implemented on different hardware. Those skilled in the art will recognize that other alternative hardware and software environments may be used without departing from the scope of embodiments of the invention. As such, the exemplary environment in FIG. 1 is not intended to limit embodiments of the invention.

FIG. 2 is a block diagram of a method 200 in accordance with an embodiment of the invention. In block 205, the late collision error flag 155 is set if the late collision error counter 145 exceeds a user settable threshold value, or the CRC error flag 160 is set if the CRC error counter 150 exceeds a user settable threshold value. The threshold value for late collision error counter 145 and for the CRC error counter 150 are typically measured in errors per second and can be set to any suitable values depending on, for example, implementation.

The fault finder 115 checks the counters 145 and 150 and sets the flags 155 and 160 if one of the counters 145 and 150 exceeds the user settable threshold value.

Late collision error is defined in the Ethernet specification. Late collisions occur when there is a late occurrence of a collision on the link. In an Ethernet network, a collision is the result of two devices on the same Ethernet network attempting to transmit data at exactly the same time. The network detects the "collision" of the two transmitted packets and discards them both. Late collision is a very good indication that one node is trying to transmit data, while the opposite node in the link is transmitting data, and therefore, a duplex mismatch may be present.

CRC is a method of checking for errors in data that has been transmitted on a communications link. A sending device applies a 16-bit or 32-bit polynomial to a block of data that is to be transmitted and appends the resulting cyclic redundancy code (CRC) to the block. The receiving end applies the same polynomial to the data and compares its result with the result appended by the sender. If the devices agree, the data has been received successfully. If not, the sender can be notified to resend the block of data.

If there is a duplex mismatch, then a node 115 will see a late collision error or a CRC error, depending on whether the node 115 is set for full-duplex or half-duplex.

After the late collision error flag 155 is set (i.e., the late collisions exceeded a user settable threshold value) or CRC flag 160 is set (i.e., the CRC errors exceeded a user settable threshold value), then in block 210, a check if a node port 140 is connected to a link 110. If, in block 210, the node port 140 is not connected to a link 110, then, in block 215, the flags 155 or 160 are cleared and a duplex mismatch is regarded as not present or as not possible. In block 220, the method 200 returns to block 205 where the fault finder 115 will check the late collision error counter 155 and the CRC error counter 160 and set the flags 155 or 160 if the collision error counter 155 or the CRC error counter 160, respectively, exceeds a user settable threshold value.

If, in block 210, the node port 140 is connected to a link 110, then, in block 225, the port 140 is checked if it is a 100TX port or 1000T port (i.e., the port 140 is checked if it is a copper port, since a duplex mismatch can only occur between copper ports). If, in block 225, the node port 140 is not a copper port, then blocks 215 and 220 are repeated as discussed above, and a duplex mismatch is regarded as not present or as not possible. Therefore, fiber ports are not checked for duplex mismatches.

If, in block 225, the node port 140 is connected to a copper port, then, in block 230, a check is performed to determine if the port 140 is connected to a gigabit link (1000T link) (i.e., the port is up in gigabit mode). A duplex mismatch will typically not occur in gigabit mode because the gigabit Ethernet standard typically only supports full-duplex for connected device (although the gigabit Ethernet standard has the half-duplex mode, it does not use the half-duplex mode). If, in block 230, the port 140 is connected to a gigabit link, then blocks 215 and 220 are repeated as discussed above, and a duplex mismatch is regarded as not present or as not possible.

If, in block 230, the port 140 is not connected to a gigabit link, then, in block 235, a check is performed on the configuration to determine if the port is set in forced mode. The forced mode can be 10HDX (half-duplex), 10FDX (full-duplex), 100HDX, or 100FDX.

If forced mode is set in block 235, then, in block 245, the is forced flag (generally flag 170, and specifically flags 170A or 170B in FIG. 1) is set by the duplex mismatch detect module 120.

If forced mode is not set in block 235, then, in block 240, a check is performed to determine if auto-negotiation was completed successfully. The duplex mismatch detect module 120 checks the PHY 135 to determine if auto-negotiation has failed. The auto-negotiation process is disclosed in the standard IEEE 802.3 clause 36, which is hereby fully incorporated herein by reference.

If auto-negotiation is not completed successfully in block 240, then blocks 215 and 220 are repeated as discussed above, and a duplex mismatch is regarded as not present or as not possible.

If auto-negotiation is completed successfully in block 240, then, in block 250, the autoHDX flag (generally flag 175, and specifically flags 175A or 175B in FIG. 1) is set by the duplex mismatch detect module 120, to indicate that the port 140 is in auto-negotiation mode and in half duplex. Note that it may be possible for a port be in auto-negotiation mode and in full duplex. However, in the embodiments described herein, the flag is looking for a possible error condition which can only occur when the port comes up in half duplex while in auto-negotiation mode.

The flags 170 and 175 are values that are set in memory in a node 105.

In block 255 (with the "return duplex mismatch is possible flags"), at this point it is known that a duplex mismatch is possible, so a message will be sent which includes the error condition denoted by these flags.

The duplex mismatch detect module 120 performs the above-mentioned actions in blocks 210 through 255.

The following blocks then insure that the correct counter has matched the perceived side of the duplex mismatch. When there is a duplex mismatch, one node 115 will detect the late collisions, while the opposite node 115 will detect the CRC errors.

In block 260, if the autoHDX flag 175 is set and the late collision counter 145 has exceeded the user settable threshold, then, in block 270, the user is informed of a duplex mismatch and a suggestion is made to the user to set the port 140 to full duplex. The autoHDX flag 175 indicates that the port 140 is currently in auto-negotiation mode and in half duplex. In block 280, the information that is generated in block 270 is provided to the user by sending an event log message 155, and the method 200 then returns to block 205 where the fault finder 115 will check the late collision error counter 155 and the CRC error counter 160 and set the flags 155 or 160 if the collision error counter 155 or the CRC error counter 160, respectively, exceeds a user settable threshold value.

The event log message generator 125 (FIG. 1) informs the fault finder 115 to generate an event log message 155 with the information in block 270.

On the other hand, in block 260, if the autoHDX flag 175 is not set or if the late collisions counter 145 did not exceed the user settable threshold, then the method 200 proceeds to block 265.

In block 265, if the isForced flag 170 is set and the CRC error counter 150 has exceeded the user settable threshold, then, in block 275, the user is informed of a duplex mismatch and a suggestion is made to the user to set the port to auto-negotiation mode. The isForced flag 170 indicates that the port 140 is currently in forced mode. In block 280, the information that is generated in block 275 is provided to the user by sending an event log message 155, and the method 200 then returns to block 205 where the fault finder 115 will check the late collision error counter 155 and the CRC error counter 160 and set the flags 155 or 160 if the collision error counter 155 or the CRC error counter 160, respectively, exceeds a user settable threshold value.

The event log message generator 125 (FIG. 1) informs the fault finder 115 to generate an event log message 155 with the information in block 275.

On the other hand, in block 265, if the isForced flag 170 is not set or if the CRC error counter 150 did not exceed the user settable threshold, then blocks 215 and 220 are repeated as discussed above, and a duplex mismatch is regarded as not present or as not possible.

The event log message generator 125 performs the above-mentioned actions in blocks 260 through 275.

Therefore, blocks 260 and 265 inform the user of a duplex mismatch and to set (change) the port 140 to either auto-negotiation mode or to full duplex. If the user is told to change the port 140 setting to full duplex (see block 270), then this means the link partner to this port 140 (i.e., where the link partner is the node 115 on the other end of link 110) is in forced mode (forced full duplex mode), and this port 140 is in auto-negotiation mode and is in half duplex due to the fact that auto-negotiation did not complete successfully.

On the other hand, if the user is told to change the port 140 setting to auto-negotiation (see block 275), then this means the link partner to this port 140 is in auto-negotiation mode, while this port is in forced mode (forced full-duplex mode).

Based on the event log message 155 that is sent to the user of the port 140, the user can change the port 145 settings in order to eliminate the duplex mismatch.

It is also within the scope of the present invention to implement a program or code that can be stored in a machine-readable medium to permit a computer to perform any of the methods described above.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure.

It will also be appreciated that one or more of the elements depicted in the drawings/figures can also be implemented in a more separated or integrated manner, or even removed or rendered as inoperable in certain cases, as is useful in accordance with a particular application.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for finding duplex mismatches in a copper based network, the method comprising:
   detecting late collisions and cyclic redundancy check (CRC) errors;
   if a port is in auto-negotiation and up in half-duplex and over threshold late collisions have been detected, then informing the user of a duplex mismatch and suggesting to the user to set the port to full duplex; and
   if the port is in forced full-duplex mode and over CRC errors have been detected, then informing the user of a duplex mismatch and suggesting to the user to set the port to auto-negotiations mode.

2. The method of claim 1, further comprising:
   if the late collisions or CRC errors exceed a user settable threshold, then determining if a port is connected to a link;
   if the port is connected to the link, then determining if the port is a copper port;
   if the port is a copper port, then determining if the port is connected to a gigabit link; and
   if the port is not connected to a gigabit link, then determining if the port is in forced mode or in auto-negotiation mode.

3. The method of claim 1, wherein the act of detecting comprises determining if the late collisions exceed a user settable threshold value.

4. The method of claim 1, wherein the act of detecting comprises determining if CRC errors exceed a user settable threshold value.

5. The method of claim 1, wherein the act of informing the user comprises sending an event log message.

6. An apparatus for finding duplex mismatches in a copper based network, the apparatus comprising:
   a node including:
   a fault finder configured to detect late collisions and cyclic redundancy check (CRC) errors; and
   a duplex mismatch finder configured to inform the user of a duplex mismatch and suggesting to the user to set the port to full duplex, if a port is in auto-negotiation and up in half-duplex and over threshold late collisions have been detected; and
   wherein the duplex mismatch finder is configured to inform the user of a duplex mismatch and suggesting to the user to set the port to auto-negotiations mode, if the port is in forced full-duplex mode and over threshold CRC errors have been detected; and
   a processor configured to execute the fault finder and the duplex mismatch finder.

7. The apparatus of claim 6, wherein the duplex mismatch finder comprises a duplex mismatch detect module configured to perform the following steps comprising: if the late collisions or CRC errors exceed a user settable threshold, then determining if a port is connected to a link;
   if the port is connected to the link, then determining if the port is a copper port;
   if the port is a copper port, then determining if the port is connected to a gigabit link; and
   if the port is not connected to a gigabit link, then determining if the port is in forced mode or in auto-negotiation mode.

8. The apparatus of claim 6, wherein the fault finder detects late collisions by determining if the late collisions exceed a user settable threshold value.

9. The apparatus of claim 6, wherein the fault finder detects late collisions by determining if CRC errors exceed a user settable threshold value.

10. The apparatus of claim 5, wherein duplex mismatch finder informs the user by sending an event log message.

11. An apparatus for finding duplex mismatches in a copper based network, the apparatus comprising:
    means for detecting late collisions and cyclic redundancy check (CRC) errors;
    coupled to the detecting means, means for informing the user of a duplex mismatch and suggesting to the user to set the port to full duplex, if a port is in auto-negotiation and up in half-duplex and over threshold late collisions have been detected, and for informing the user of a duplex mismatch and suggesting to the user to set the port to auto-negotiations mode if the port is in forced full-duplex mode and over threshold CRC errors have been detected.

12. An article of manufacture, comprising:
    a machine-readable medium having stored thereon instructions to:
    detect late collisions and cyclic redundancy check (CRC) errors;
    if a port is in auto-negotiation and up in half-duplex and over threshold late collisions have been detected, then inform the user of a duplex mismatch and suggest to the user to set the port to full duplex; and
    if the port is in forced full-duplex mode and over threshold CRC errors have been detected, then inform the user of a duplex mismatch and suggest to the user to set the port to auto-negotiations mode.

* * * * *